United States Patent
Hagenbucher et al.

(10) Patent No.: US 10,508,199 B2
(45) Date of Patent: Dec. 17, 2019

(54) PHOTOCURABLE EPOXY RESIN SYSTEMS

(71) Applicant: Henkel AG & Co. KGaA, Duesseldorf (DE)

(72) Inventors: Melanie Hagenbucher, Deusseldorf (DE); Martin Hornung, Bammental (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 53 days.

(21) Appl. No.: 15/258,547

(22) Filed: Sep. 7, 2016

(65) Prior Publication Data

US 2016/0376435 A1 Dec. 29, 2016

Related U.S. Application Data

(63) Continuation of application No. PCT/EP2015/054697, filed on Mar. 6, 2015.

(30) Foreign Application Priority Data

Mar. 7, 2014 (DE) .................. 10 2014 204 265

(51) Int. Cl.
| | |
|---|---|
| C08L 63/00 | (2006.01) |
| C08K 5/00 | (2006.01) |
| B05D 1/02 | (2006.01) |
| B05D 1/18 | (2006.01) |
| B05D 3/06 | (2006.01) |
| C08G 59/22 | (2006.01) |
| C23F 15/00 | (2006.01) |

(52) U.S. Cl.
CPC ............... *C08L 63/00* (2013.01); *B05D 1/02* (2013.01); *B05D 1/18* (2013.01); *B05D 3/067* (2013.01); *C08G 59/22* (2013.01); *C08K 5/00* (2013.01); *C08K 5/0025* (2013.01); *C23F 15/00* (2013.01); *B05D 2202/00* (2013.01); *B05D 2504/00* (2013.01)

(58) Field of Classification Search
CPC ......... C08L 63/00; C08K 5/00; C08K 5/0025; B05D 1/02; B05D 1/18; B05D 3/067; B05D 2202/00; B05D 2504/00; C08G 59/22; C23F 15/00
USPC ........................................................ 522/100
See application file for complete search history.

(56) References Cited

U.S. PATENT DOCUMENTS

| | | |
|---|---|---|
| 5,346,939 A | 9/1994 | Moren et al. |
| 5,726,216 A | 3/1998 | Janke et al. |
| 7,642,296 B2 | 1/2010 | Huesler et al. |
| 8,501,033 B2 * | 8/2013 | Southwell ............... C08G 65/18 |
| | | 252/182.11 |

FOREIGN PATENT DOCUMENTS

| | | |
|---|---|---|
| CN | 1942424 | 4/2007 |
| CN | 102272227 | 12/2011 |
| JP | H06507664 | 3/1992 |
| JP | H07503266 | 11/1992 |
| WO | 9220754 | 3/1992 |
| WO | 9315124 | 8/1993 |
| WO | 9705172 | 2/1997 |
| WO | 2010104603 | 9/2010 |
| WO | 2013151835 | 3/2013 |

OTHER PUBLICATIONS

International Search Report issued in connection with International Application No. PCT/EP2015/054697 dated May 18, 2015.

\* cited by examiner

*Primary Examiner* — Sanza L. McClendon
(74) *Attorney, Agent, or Firm* — Steven C. Bauman

(57) ABSTRACT

The invention is directed to a photocurable epoxy resin composition that is tougher and more flexible and contains 30 to 90 wt % of at least one aromatic epoxy resin; 2 to 30 wt % of at least one core-shell rubber (CSR); up to 20 wt % of at least one flexibilizer comprising reactive functional groups selected from among epoxy groups, carboxylate groups, amino groups and/or hydroxyl groups; and 1 to 4 wt % of at least one cationic photoinitiator. Also disclosed are the use of said composition for sealing and/or coating materials as well as corresponding coating/sealing processes.

12 Claims, No Drawings

PHOTOCURABLE EPOXY RESIN SYSTEMS

The present invention is directed to a photocurable epoxy resin composition that is tougher and more flexible and contains an aromatic epoxy resin, a toughener, a flexibilizer and a cationic photoinitiator.

In certain fields of application, resin systems that have excellent adhesion properties and higher resistance to ageing combined with short production cycle times are required. UV-curable epoxy resin systems are particularly suitable for such applications. However, available systems have the disadvantage that they become brittle when exposed to fast and high temperature fluctuations. This is a significant problem in particular in the sealing of electrical lines and contacts, since porous and brittle sealing compounds lead to electrochemical corrosion.

There is therefore a need for epoxy resin systems which have a higher flexibility and therefore also withstand severe temperature fluctuations without becoming brittle. In addition, such systems should have a high toughness and a good adhesion to most metal substrates, in particular aluminum.

The present invention is based on the finding of the inventors that a composition based on aromatic epoxy resins, which additionally contains core-shell rubber as toughener, a flexibilizer and a cationic photoinitiator, has the desired properties, i.e. provides an epoxy resin system which has both a high flexibility and a high toughness and at the same time has good adhesion properties, even on metal substrates, and also has a sufficiently high reactivity so as to ensure short production cycles.

In a first aspect, the present invention is therefore directed to a photocurable epoxy resin composition containing (a) 30 to 90 wt %, preferably 50 to 85 wt %, of at least one aromatic epoxy resin;

(b) 2 to 30 wt %, preferably 5 to 15 wt %, of at least one core-shell rubber as toughener;

(c) 1 to 20 wt %, preferably 5 to 10 wt %, of at least one flexibilizer comprising reactive functional groups selected from among epoxy groups, carboxylate groups, amino groups and/or hydroxyl groups; and (d) 1 to 4 wt %, preferably 1.5 to 2.5 wt % of at least one cationic photoinitiator, preferably comprising a sulfonium salt and/or iodonium salt.

In a further aspect, the invention relates to the use of epoxy resin compositions of this type as sealing material, in particular for sealing metal-containing electrical lines or contacts for protection against electrochemical corrosion.

In yet a further aspect, the invention also relates to a process for sealing metal-containing electrical lines or contacts for protection against electrochemical corrosion, said process comprising the steps of:

(i) applying the photocurable epoxy resin composition described herein to metal-containing electrical lines or contacts in the form of a film; and (ii) curing the film by exposure to light.

As used herein, the term "at least one" means 1 or more, for example 2, 3, 4, 5, 6, 7, 8, 9 or more. In the context of a constituent of the composition, the expression relates to the type of constituent, i.e. "at least one aromatic epoxy resin" means for example that the composition can contain one type of aromatic epoxy resin or a number of different aromatic epoxy resins.

All percentages are, unless otherwise stated, in wt %, in each case in relation to the total composition. In conjunction with "at least one" type of constituent, the percentage relates to the total amount of the specified type of constituent in the composition, i.e. "30 to 90 wt % of at least one aromatic epoxy resin" means for example that the composition contains a total of 30-90 wt % of aromatic epoxy resins.

All circumstances, subjects and embodiments described herein hereinafter for the resin compositions are also applicable to the described uses and processes, and vice versa.

Epoxy Resin

The aromatic epoxy resins usable herein are preferably polyglycidyl epoxy compounds or epoxy novolacs. Suitable polyglycidyl epoxies include, but are not limited to, polyglycidyl ethers, poly(β-methylglycidyl) ethers, polyglycidyl esters and poly (β-methylglycidyl) esters. Examples of such polyglycidyl ethers and poly(β-methylglycidyl) ethers are those based on monocyclic phenols, such as resorcinol or hydroquinone, and polycyclic phenols such as bis(4-hydroxyphenyl) methane (bisphenol F), 2,2-bis(4-hydroxyphenyl) propane (bisphenol A), bis(4-hydroxyphenyl) sulfone (bisphenol F), wherein the aforementioned may optionally be substituted, for example with alkoxy radicals or halogen radicals, as well as phenol novolacs and cresol novolacs. Suitable polyglycidyl esters and poly(β-methylglycidyl) esters can be prepared by reacting epichlorohydrin, 1,3-dichlorohydrin or β-methylepichlorohydrin with aromatic polycarboxylic acids, such as phthalic acid, isophthalic acid, terephthalic acid, trimellitic acid and pyromellitic acid. Also suitable are mixtures of the aforementioned aromatic epoxy resins. The epoxy resins preferably contain on average more than one, preferably at least 2 epoxy groups per molecule.

The at least one aromatic epoxy resin is, in various embodiments, selected from diglycidyl ethers based on bisphenol A, F and/or S and epoxy novolacs and mixtures thereof, in particular from bisphenol A diglycidyl ethers and bisphenol F diglycidyl ethers and mixtures thereof.

The aromatic epoxy resin preferably has an epoxy equivalent weight of 120 to 1000 g/eq, particularly preferably of 120 to 600 g/eq, even more particularly preferably of 150 to 250 g/eq (determinable in accordance with DIN 16945).

In the compositions described herein, the aromatic epoxy resins form the base resin. They usually account for 30 to 90 wt %, in particular 50 to 85 wt %, of the total epoxy resin composition. The proportion of the aromatic epoxy resins is at least 30 wt %, in particular at least 40 wt %, preferably at least 50 wt %, particularly preferably at least 60 wt %, and at most 90 wt %, in particular at most 85 wt %, preferably at most 80 wt %, in each case in relation to the total composition. The preferred proportions of aromatic epoxy resins are particularly advantageous in view of flexibility and toughness.

Toughener

The tougheners used in accordance with the invention are core-shell rubbers (CSRs). In various embodiments of the invention the tougheners are core-shell rubbers which can be present dispersed in a resin matrix, in particular an epoxy resin matrix. The epoxy resin matrix preferably contains aromatic epoxy resins, wherein the aromatic epoxy resins of the matrix, in particularly preferred embodiments, are selected from those disclosed above in conjunction with the aromatic epoxy base resin. In particular, suitable matrix materials include epoxy novolacs, epoxy-group-containing biphenols, in particular diglycidyl ethers based on bisphenol A, F or S. In various embodiments the core-shell rubbers are dispersed in such a matrix, wherein the matrix is preferably selected from aromatic epoxy resins, in particular diglycidyl ethers based on bisphenol A, F and/or S and epoxy novolacs. If the core-shell rubbers are present in an aromatic epoxy resin matrix, the amount of aromatic epoxy resin counts towards the proportion of the total aromatic epoxy resins in the composition.

In various embodiments the (polymer) composition, which forms the shell of the core-shell rubber, has a sufficient affinity for the epoxy resin used as matrix and/or base resin, such that the core-shell rubber particles are present in the epoxy resin as primary particles, dispersed in a stable manner.

Both the core and the shell of the core-shell rubber consists of a polymer having glass transition temperatures preferably less than 0° C., preferably −30° C. or lower. The glass transition temperature can be determined by means of DSC (in accordance with DIN EN ISO 11357 at a heating rate of 10° C./min).

The core-shell rubber particles preferably have a size of 0.03 to 50 μm, particularly preferably 1 to 20 μm, even more particularly preferably of less than 5 μm. A core-shell rubber particle usually even has an average diameter of just 500 nm or less than 200 nm, i.e. approximately 25 to 22 nm or 50 to 150 nm.

The core material of a CSR preferably consists of a diene homopolymer or a copolymer having elastomeric properties, such as a homopolymer of butadiene or isoprene, a copolymer of butadiene or isoprene with one or more ethylenically unsaturated monomer(s), such as vinyl aromatic monomer(s), (meth)acrylonitrile and/or (meth)acrylate. Preferred polymers as core material are selected from polybutadiene, polybutyl acrylate, polydimethylsiloxane, polyacrylates, polymethacrylates, poly(meth)acrylic acids and poly(meth)acrylic esters and co- or terpolymers thereof with polystyrene, polyacrylonitrile or polysulfide, more particularly preferably from polybutadiene, polydimethylsiloxane or polybutyl acrylate. Elastomeric polysiloxanes, such as polydimethylsiloxane or crosslinked polydimethylsiloxane, are also suitable as core material.

The diene homo- and copolymers already disclosed above as core material are preferably used as shell material.

The core-shell rubber particles can consist of a number of layers, for example more than two layers. A CSR of this type preferably has a central core, which consists of a first diene homopolymer or copolymer having elastomeric properties, which is enclosed by a second core formed from a second (different) diene homopolymer or copolymer, likewise having elastomeric properties.

If a polymer or a copolymer not having elastomeric properties (preferably a thermoplastic or thermoset/cross-linking polymer) is to be used as shell material, polymers of this type are selected for example from polystyrene, poly(meth)acrylamide, polyacrylonitrile, polyacrylate mono-, co- or terpolymers, polymethacrylate mono-, co- or terpolymers or styrene/acrylonitrile/glycidyl methacrylate terpolymers, or from a polymer or a copolymer from among one or more monomers of unsaturated acids and anhydrides (for example acrylic acid).

In various embodiments of the present invention the used CSRs have a core and at least two concentric shells having different chemical compositions and/or properties.

Particles which have a core formed from polybutadiene and a shell formed from polybutadiene, polystyrene or a polybutadiene-polystyrene copolymer are preferred.

Suitable CSRs are commercially obtainable for example from Kaneka and are present in the form of phase-separated particles dispersed in epoxy resins. These particles have a core formed from a copolymer of (meth)acrylate-butadiene-styrene, wherein butadiene is the primary component of the copolymer.

Further commercially obtainable masterbatches of core-shell rubber particles dispersed in epoxy resins are, for example, the product Genioperl M23A from Wacker (a dispersion of 30 wt % CSR in an aromatic epoxy resin based on bisphenol A diglycidyl ether; the CSRs have an average diameter of approximately 100 nm and contain a core formed from elastomeric crosslinked silicone, onto which an epoxy-functional acrylate copolymer has been grafted).

The production of the CSRs is known. CSRs are preferably obtainable by emulsion polymerization, suspension polymerization, or micro-suspension polymerization, preferably by emulsion polymerization. Here, the shell is preferably grafted onto the core. The (wt %) ratio of core layer:shell layer in the CSRs is preferably 50:50 to 95:5, particularly preferably 60:40 to 90:10.

The core-shell rubbers are preferably used in the form in which the core-shell rubbers are present prior to introduction into the composition, i.e. dispersed in a resin matrix, in particular an epoxy resin matrix, preferably an aromatic epoxy resin matrix. Here, the proportion of the CS rubbers is preferably approximately 5 to 40 wt % preferably 8 to 30 wt %, wherein the rest consists substantially or exclusively of the matrix. Thus, a preferred embodiment is when core-shell rubbers in a resin matrix, in particular an epoxy resin matrix, preferably an aromatic epoxy resin matrix, are used as toughener. If the core-shell rubbers are already present in a resin matrix, this leads more easily to more homogenous compositions, resulting in more uniform product properties, particularly with regard to flexibility and toughness.

Mixtures of different CSRs (having different particle sizes, glass transition temperatures, core polymer, shell polymer) can also be used.

The ratio of the total aromatic epoxy resin as base resin to core-shell rubber particles is usually preferably not less than 1:1 and not more than 40:1, preferably 3:1 to 20:1 or 5:1 to 15:1. The ratio of matrix (epoxy-based prepolymers):CSR is preferably not less than 0.2:1 and not more than 5:1, preferably 1:1 to 3:1.

In various embodiments the described epoxy resin composition therefore contains 2 to 30 wt %, preferably 5 to 15 wt %, in each case in relation to the total composition, of at least one of the above-described core-shell rubbers. The proportion of core-shell rubber is at least 2 wt %, in particular at least 3 wt %, preferably at least 5 wt %, and at most 30 wt %, in particular at most 20 wt %, preferably at most 15 wt %, particularly preferably at most 10 wt %, in each case in relation to the total composition. The preferred proportions are particularly advantageous in view of flexibility and toughness.

In addition to the above-descried CSRs, the composition according to the invention can also contain other tougheners, for example those described below as co-tougheners.

Flexibilizer

The flexibilizers used herein are compounds comprising reactive functional groups selected from among epoxy groups, carboxylate groups, amino groups and/or hydroxyl groups and able to react with other compounds of the composition during the course of curing. As described previously, the flexibilizers are an additional component which in particular is different from the aromatic epoxy resins, which is why, in particular, the flexibilizers are not aromatic epoxy resins.

Suitable flexibilizers for example include, but are not limited to, polymers and oligomers having a glass transition temperature of below 20° C. (preferably below 0° C. or below −30° C. or −50° C.) comprising the above-mentioned reactive functional groups and able to react with other compounds of the preparation during the course of curing.

In particular, compounds containing epoxy groups and hydroxyl groups are preferred as flexibilizers.

For example, epoxy compounds that can be used as reactive diluents, but have a particularly flexible backbone are suitable, such as monoglycidyl ethers, i.e. glycidyl ethers of monovalent phenols or alcohols, or polyglycidyl ethers or esters, for example diglycidyl ethers or esters of aliphatic diols or dicarboxylic acids, or also cycloaliphatic epoxy resins, such as (di)ethers or (di)esters based on 3,4-epoxy-cyclohexyl-methanol. Monoglycidyl ethers of a phenol or (3,4-epoxycyclohexyl-1-yl)methyl esters of a monobasic or dibasic carboxylic acid are preferred. Aliphatic or cycloaliphatic epoxy compounds are especially preferred.

Examples of such compounds that are suitable as flexibilizers include, but are not limited to, monoglycidyl ethers of cardanols and diesters based on 3,4-epoxycyclohexylmethanol, for example bis((3,4-epoxycyclohexyl)methyl) adipate.

Compounds containing hydroxyl groups are likewise suitable and preferred in accordance with the invention, in particular compounds containing primary hydroxyl groups. These preferably have a functionality of at least 1, preferably at least 2, and are free from groups that can inhibit the curing reaction. The compounds containing hydroxyl groups can be aliphatic or aromatic compounds. Examples are polyester polyols, polyether polyols and polyester/polyether polyols, hydroxyl- and hydroxyl-/epoxy-functionalized polybutadienes, polycaprolactone diols or triols, and ethylene/butylene polyols. The flexibilizers containing hydroxyl groups preferably have a weight-average molecular weight of 200 to 5000, preferably 300 to 2500 g/mol (determinable by means of GPC against a polystyrene standard). The flexibilizers containing hydroxyl groups preferably carry at least 2 OH groups per molecule, preferably 2.2 to 4.

In various embodiments the at least one flexibilizer is selected from the group consisting of polytetramethylene ether glycol ("poly THF") and polycaprolactone diol or triol, preferably polycaprolactone triol.

Poly THF preferably has a weight-average molecular weight in the range of 250-2500 and is preferably hydroxyl-terminated, but can also be epoxy-terminated. Commercially obtainable caprolactone-based oligo- or polyesters include, for example, the preferred trimethylolpropane triesters with caprolactone.

In various preferred embodiments the at least one flexibilizer has a sufficient affinity for the epoxy resin used as base resin to be soluble therein and to not form a separate phase.

The amount of at least one flexibilizer, as defined above, in the described compositions is 1 to 20 wt %, preferably 5 to 10 wt %, in each case in relation to the total composition.

Photoinitiator

The compositions described herein are "photocurable," i.e. they are cured by a polymerization reaction initiated by light. Here, the compositions are polymerized cationically with the aid of a cationic photoinitiator, which forms cations with the absorption of a certain light wavelength.

The cationic photoinitiator can be one of those used conventionally for cationic polymerization. Examples include onium salts with anions of low nucleophilicity, such as halonium salts, iodonium salts, sulfonium salts, sulfoxonium salts or diazonium salts. Suitable anions include, for example, hexafluoroantimonate, hexafluorophosphate or tetrakis(pentafluorophenyl)borate. Sulfonium salts and iodonium salts are preferred, wherein the counterion is selected from among hexafluoroantimonate, hexafluorophosphate and (tetrakis(pentafluoroaryl)borates, in particular from among triarylsulfonium salts and bis(alkylphenyl)iodonium salts.

Examples of commercially obtainable photoinitiators which are suitable in accordance with the invention include, but are not limited to, UV 1242 (bis(dodecylphenyl)iodonium hexafluoroantimonate)), UV 2257 (bis(4-methylphenyl)iodonium hexafluorophosphate)), Irgacure 290 (triarylsulfonium borate) (BASF SE) and Cyracure UVI 9676 (triarylsulfonium hexafluoroantimonate) (Dow Chemicals). UV 2257 is particularly preferred.

The above-described photoinitiators can be used individually or as a mixture, preferably in amounts from 1 to 4 wt %, preferably 1.5 to 2.5 wt %, in each case in relation to the total weight of the composition.

Further Constituents

The preparation according to the invention can furthermore contain further additional ingredients, such as adhesion promoters, co-tougheners, reactive diluents, fillers, dyes, pigments, dispersants, anti-foaming agents, antioxidants, flame retardants, thixotropic agents, stabilizers, rheology modifiers (for example fumed silicic acid), ageing inhibitors and/or corrosion inhibitors.

For example, one or more reaction products of epoxy resins with compounds containing chelating functional groups (what are known as chelate-modified epoxy resins) can be used as adhesion promoters.

Such reaction products include substances that are known as chelate epoxies or chelating epoxy resins. The chelating functional groups include those functional groups able to form chelate bonds with divalent or polyvalent metal atoms, either by themselves or in co-operation with other functional groups also positioned in the molecule.

Suitable chelating functional groups include preferably phosphoric acid groups, for example $—PO(OH)_2$), carboxylic acid groups ($—COOH$), sulfuric acid groups ($—SO_3H$), amino groups, and hydroxyl groups (particularly hydroxyl groups adjacent to each other in an aromatic ring). The production of such (chelate) reaction products is known.

Reaction products of epoxy resins and components comprising chelating functional groups are commercially obtainable for example under the product names ADEKA Resins EP-4910N, EP-49-55C, EP-49-10, EP-49-20, EP-49-23 and EP-49-25 (Asahi Denka).

Epoxy-modified silanes, such as glycidylalkyl-modified silanes, in particular trimethoxysilanes, preferably glycidoxypropyl trimethoxysilane, can also be used as adhesion promoters. Silanes of this type are commercially obtainable for example as Silquest™ A-187.

Preparations according to the invention usually contain preferably 0.1 wt % to 3 wt %, even more preferably 0.5 to 2 wt % of adhesion promoter in relation to the total preparation. Chelate-modified epoxy resins are preferably used in amounts of 1-2 wt %, and the described silanes are preferably used in amounts of 0.2 to 1 wt %, preferably approximately 0.5 wt %.

The reactive diluents, provided they do not count as flexibilizers, can be used in accordance with the invention in amounts of 0.1-10 wt %, particularly preferably 5-10 wt %, in each case in relation to the total preparation. Preferred reactive diluents in various embodiments are selected from monoglycidyl ethers of aliphatic or aromatic alcohols, in particular C12/C14 fatty alcohols and alkylphenols, preferably para-tert-butyl phenol, and oxetanes, in particular trimethylolpropane oxetane (TMPO). Monoglycidyl ethers of aromatic alcohols and particularly preferably low-molecular oxetanes such as TMPO are preferred.

The compositions described herein can also contain co-tougheners, in particular in amounts of 0.1-10 wt %, particularly preferably 0.5-2.5 wt %, in each case in relation to the total composition.

Suitable co-tougheners can be selected from hydroxyl-terminated polymers, preferably with low Tg (glass transition temperatures of preferably less than 0° C., preferably −30° C. or lower), for example polyether polyols, in particular block copolymers of various polyether polyols, wherein one block of the copolymer preferably is not soluble in the epoxy base resin and the other block is soluble in the epoxy base resin, such that two phases are formed. An example of a suitable compound is a polypentylene-polyethylene glycol block copolymer, as is commercially obtainable under the trade name Fortegra™ 100.

It is also advantageous if the compositions contain a fluorescence marker, preferably in amounts of 0.01 to 1 wt %, particularly preferably 0.05 to 0.5 wt %, in each case in relation to the total composition. Due to the use of fluorescence markers, a quality check of the product can be performed, without any adverse influence on the flexibility and toughness. Examples of preferred fluorescence markers are 4,4'-bis(2-sulfostyrl)-biphenyl disodium salt (obtainable from BASF under the name Tinopal® NFW liquid):

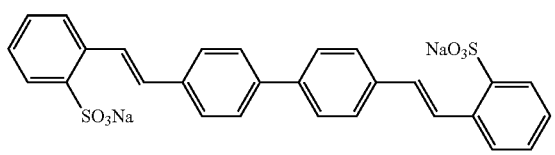

or Tinopal® OB (BASF):

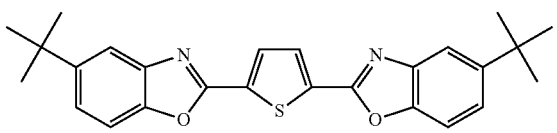 [SMILES: CC(C)(C)c1ccc2oc(-c3ccc(-c4nc5cc(C(C)(C)C)ccc5o4)s3)nc2c1]

wherein 4,4'-bis(2-sulfostyrl)-biphenyl disodium salt is particularly preferred.

The compositions according to the invention preferably also contain a photosensitizer. The photosensitizer, here, makes it possible for the used photoinitiator to be excited over a broader wavelength range and/or at other light wavelengths, in particular at other wavelengths without itself acting as a photoinitiator.

By way of example, photoinitiators based on an iodonium salt require, for their excitation, UV light having a wavelength<280 nm (UV-C range). In order to enable an activation at higher wavelength, photosensitizers which are excited at higher wavelengths (UV-A range) are added. The excited molecule (photosensitizer) enters an "energy complex" with the photoinitiator, thus starting the polymerization of the epoxy. Preferred examples are 9,10-dibutoxyanthracenes, isopropylthioxanthone and 2-ethyl-9,10-dimethoxyanthracene.

The proportion of the photosensitizer is preferably 0.01 to 2 wt %, particularly preferably 0.1 to 1 wt %, in each case in relation to the total composition. The flexibility and toughness of the systems is not influenced here or can be purposefully adjusted with the used photoinitiator-photosensitizer system, wherein the ratio of photoinitiator to photosensitizer is preferably 20:1 to 1:1, in particular 5:1 to 2:1.

The compositions described herein can be produced by means of the processes known in the prior art.

To produce the compositions according to the invention, the base resin and the toughener are preferably blended in an agitator under vacuum at room temperature. Flexibilizers and, as appropriate, reactive diluents are added to the mixture, which is stirred again under vacuum. If an adhesion promoter is added, this is added in a final step and the mixture is mixed again at room temperature under vacuum. If a fluorescence marker and/or photosensitizer are added, these are added last and the mixture is mixed again at room temperature under vacuum.

In a preferred embodiment of the production process, core-shell rubbers are used as tougheners and, prior to the introduction into the base resin, are present in a resin matrix, in particular an epoxy resin matrix, preferably an aromatic epoxy resin matrix.

Application

A further subject of the present invention is the use of the composition according to the invention as a coating or sealing means, in particular for the coating or sealing of electrical lines or contacts, preferably those that consist of or contain metal. The use of the composition to coat or seal aluminum substrates is particularly preferred.

A coating of this type protects the underlying material against electrochemical corrosion, for example.

The photocurable epoxy resin composition described herein can be applied to metal-containing electrical lines or contacts, for example in the form of a film, for the purpose of sealing or coating of metal-containing electrical lines or contacts for protection against electrochemical corrosion. The composition can be applied by means of known processes, for example by spraying, dipping, etc. The composition is then cured by light-initiated cationic polymerization. The light used to start the polymerization reaction is preferably short-wave light, for example UV light.

The products coated or sealed by the compositions described herein, i.e. in particular electrical lines or contacts, preferably contain aluminum or consist of aluminum. The following examples are used to explain the invention in greater detail.

EXAMPLES

Materials:
Epoxy Base Resin:
Aromatic epoxy resin aE1: Blend of BADGE (bisphenol A diglycidyl ether) and BFDGE (bisphenol F diglycidyl ether)
Cycloaliphatic epoxy resin cE2: (3,4-epoxycyclohexylmethyl-3,4-epoxycyclohexane carboxylate)

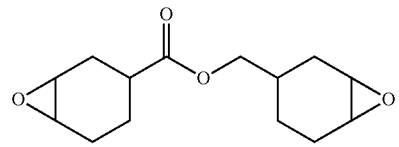 [SMILES: O=C(OCC1CCC2OC2C1)C1CCC2OC2C1]

Core-Shell (CS) Materials:
CS1: BFDGE+25% CS (polybutadiene)
CS2: BADGE+25% CS (styrene-butadiene copolymer)
CS3: cycloaliphatic epoxy resin (ERL 4221)+25% CS (styrene-butadiene copolymer)

Above all, CS1 and CS2 lead to products having excellent flexibility and toughness.

Co-toughener: Fortera 100 (polyol derivative). Concentration identified as ideal for good toughness and flexibility alongside high reactivity: 2%

Flexibilizers:
F1: monofunctional epoxy based on cardanol
F2: caprolactone triol (Mw~300 g/mol)
F3: bis(3,4-epoxycyclohexyl)methyl)adipate
F4: polytetramethylene ether glycol (Mw~1400 g/mol)

All flexibilizers F1 to F4 are suitable for production of flexible and suitably tough films. The best results with regard to flexibilization were obtained with use of flexibilizer F2; flexibilizer F4 also leads to significantly increased flexibility. Concentration identified as ideal with regard to F2:10%

Reactive Diluent
R1: monofunctional glycidyl ethers of para-tert-butyl phenol
R2: aliphatic monoglycidyl ethers of $C_{12}/C_{14}$ fatty acid alcohol
R3: trimethylolpropane oxetane (TMPO)

A standard reactive diluent is R1. R2 was used because R2 has a lower viscosity compared with R1, however the resultant films are minimally more brittle. R3 was used to increase the reaction speed of the system (oxetane-reactive, OH group additionally accelerates polymerization); in addition it was found that flexibility and toughness are increased by use of R3.

Photoinitiators (PI):
Cyracure UVI 9676: triarylsulfonium hexafluoroantimonate (50 wt % dissolved in propylene carbonate; Dow Chemicals):

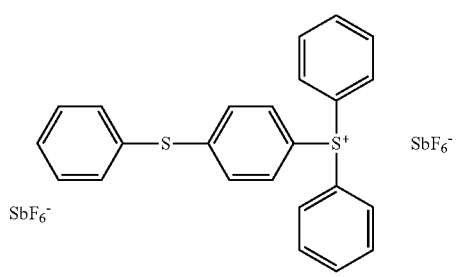

Irgacure 290: triarylsulfonium borate (100%; BASF):

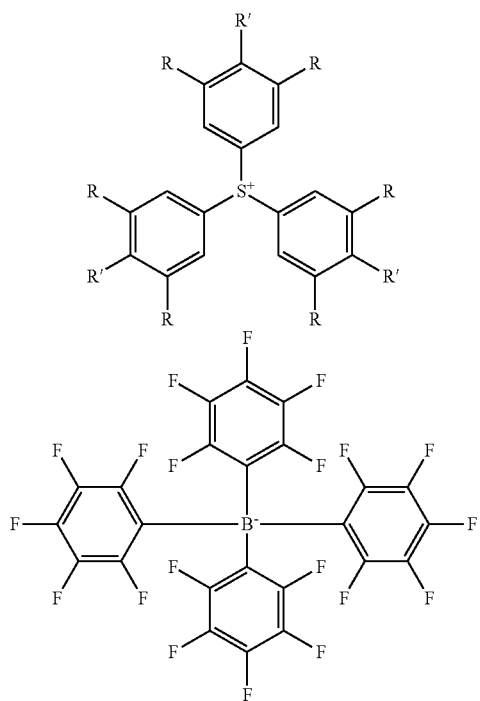

UV 1242: bis(dodecylphenyl)iodonium hexafluoroantimonate (50 wt % in C12/C14 glycidyl ether; Deuteron):

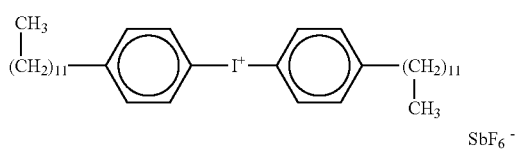

UV 2257: bis(4-methylphenyl)iodonium hexafluorophosphate (50 wt % in propylene carbonate; Deuteron):

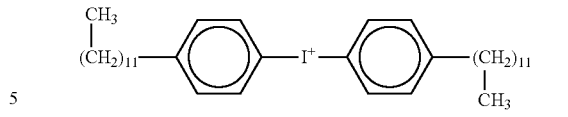

Flexible, tough systems can be obtained with all four used photoinitiators. The best results with regard to flexibility and toughness were attained for PI concentrations of 1% for undissolved PI (Irgacure 290) or 1.5%-2% for dissolved PI (Cyracure UVI 6976; UV 1242 and UV 2257).

Adhesion Promoters:

H1: chelate-modified epoxy resin

H2: 3-glycidoxypropyl trimethoxysilane

Example 1

In order to produce the compositions according to the invention, the base resin and the toughener were blended in an agitator under vacuum at room temperature. Flexibilizers and, as appropriate, reactive diluents were added to the mixture, which was stirred again under vacuum. The photoinitiator was then added and stirred under vacuum. If an adhesion promoter was added, this was added in a final step and the mixture was mixed again at room temperature under vacuum.

To check flexibility and toughness, thin films were produced that were cured by means of UVA-LOC 1000 (30 s, 100 W, Fe-doped mercury lamp). To ensure complete curing, the films were then post-cured for 30 min at 100° C. The films were then tested by hand for flexibility and toughness.

The following compositions were produced, which were characterized by particularly good results with regard to flexibility and toughness with good reactivity and adhesion:

| Sample | 1 | 2 | 3 | 4 |
|---|---|---|---|---|
| aromatic epoxy resin aE1 | 58.8 | 49 | 48 | 48.25 |
| core-shell material CS1 | 29.4 | 29.4 | 28.8 | 28.95 |
| co-toughener | | | 2 | 2 |
| flexibilizer F2 | 9.8 | 9.8 | 9.6 | 9.65 |
| reactive diluent R1 | | 9.8 | | |
| reactive diluent R3 | | | 9.6 | 9.65 |
| PI Cyracure UVI 9676 | 2 | | | |
| PI Irgacure 290 | | 1 | | |
| PI UV 2257 | | | 2 | 1.5 |
| adhesion promoter H1 | | 0.5 | | |

Example 2: Comparative Examples

Procedure and test for checking flexibility and toughness: Production of thin films cured by means of UVA-LOC 1000 (30 s, 1000 W, Fe-doped mercury lamp). To examine the ageing behavior, the films were then stored for 1 h and 14 h at 130° C. in an oven and tested by hand for flexibility and toughness. Scoring scale: from 1 (very flexible/very high tensile strength) to 6 (very brittle, high crack growth).

1. Influence of Epoxy Resin

As a comparison according to the invention, samples 1 and 3 from example 1 were used and the aromatic epoxy base resin was replaced by the same amount, in each case, of cycloaliphatic epoxy resin cE2.

Overview of the Flexibility and Toughness Test

| | Base | | Flexibility | | | Toughness | | |
|---|---|---|---|---|---|---|---|---|
| Sample | epoxy resin | Photoinitiator | before ageing | 1 h @ 130° C. | 14 h @ 130° C. | before ageing | 1 h @ 130° C. | 14 h @ 130° C. |
| 1 | aE1 | Cyracure 6976 | 1 | 2 | 2 | 1 | 2-3 | 2-3 |
| CE1 | cE2 | Cyracure 6976 | 3 | 3-4 | 4 | 3 | 3-4 | 4 |
| 3 | aE1 | UV 2257 | 1 | 1 | 1 | 1 | 1-2 | 1-2 |
| CE2 | cE2 | UV 2257 | 1 | 2 | 3 | 1 | 2 | 3 |

Composition of the Formulations (Values in %)

| Sample: | 1 | CE1 | 3 | CE2 |
|---|---|---|---|---|
| aromatic base resin aE1 | 58.8 | | 48 | |
| cycloaliph. base resin cE2 | | 58.8 | | 48 |
| toughener CS1 | 29.4 | 29.4 | 28.8 | 28.8 |
| co-toughener | | | 2.0 | 2.0 |
| flexibilizer F2 | 9.8 | 9.8 | 9.60 | 9.60 |
| reactive diluent R3 | | | 9.60 | 9.60 |
| PI Cyracure 6976 | 2 | 2 | | |
| PI UV 2257 | | | 2 | 2 |
| Sum: | 100 | 100 | 100 | 100 |

The use of cycloaliphatic epoxy resin clearly leads to a less flexible system compared to formulations based on an aromatic epoxy resin.

The results also show that the flexibility in cycloaliphatic system decreases with age; by contrast, flexibility and tensile strength decrease to a much lesser extent in the systems based on aromatic epoxy resin.

2. Influence of the Core-Shell (CS) Material (Toughener):

Here, the use of core-shell materials based on cycloaliphatic epoxy resins (UVR 6110) in contrast to core-shell materials based on aromatic epoxy resin (BFDGE) was examined.

Overview of the Flexibility and Toughness Test

| | | Base | | Flexibility | | | Toughness | | |
|---|---|---|---|---|---|---|---|---|---|
| Sample | CS material | epoxy resin | Photoinitiator | before ageing | 1 h @ 130° C. | 14 h @ 130° C. | before ageing | 1 h @ 130° C. | 14 h @ 130° C. |
| 1 | CS1 | aE1 | Cyracure 6976 | 1 | 2 | 2 | 1 | 2-3 | 2-3 |
| 5 | CS3 | aE1 | Cyracure 6976 | 3 | 3 | 3 | 3 | 3 | 4 |
| CE3 | CS3 | cE2 | Cyracure 6976 | 4 | 4 | 4 | 4 | 4 | 4 |
| 3 | CS1 | aE1 | UV 2257 | 1 | 1 | 1 | 1 | 1-2 | 1-2 |
| 6 | CS3 | aE1 | UV 2257 | 1 | 1-2 | 3 | 1 | 1-2 | 2 |
| CE4 | CS3 | cE2 | UV 2257 | 1 | 2 | 3 | 1 | 2 | 2-3 |

Composition of the Formulations (Values in %)

| | Sample: | | | | | |
|---|---|---|---|---|---|---|
| | 1 | 5 | CE3 | 3 | 6 | CE4 |
| aromatic base resin aE1 | 58.8 | 58.8 | | 48 | 48 | |
| cycloaliph. base resin cE2 | | | 58.8 | | | 48 |
| toughener CS1 | 29.4 | | | 28.8 | | |
| toughener CS3 | | 29.4 | 29.4 | | 28.8 | 28.8 |
| co-toughener | | | | 2.0 | 2.0 | 2.0 |
| flexibilizer F2 | 9.8 | 9.8 | 9.8 | 9.60 | 9.60 | 9.60 |
| reactive diluent R3 | | | | 9.60 | 9.60 | 9.60 |
| PI Cyracure 6976 | 2 | 2 | 2 | | | |
| PI UV 2257 | | | | 2 | 2 | 2 |
| Sum: | 100 | 100 | 100 | 100 | 100 | 100 |

As had already been found in the case of the examinations relating to the base epoxy resin, it was shown similarly that the use of CS rubber particles embedded in an aromatic epoxy resin matrix is particularly preferred with regard to flexibility and toughness, in particular after ageing. However, the combination of an aromatic epoxy base resin with CS materials having a cycloaliphatic epoxy resin matrix also results in functioning systems, particularly with use of the photoinitiator UV 2257. The combination of cycloaliphatic base epoxy resin and CS materials having a cycloaliphatic epoxy resin matrix leads to systems without aromatic epoxy resin and therefore to systems that have the lowest flexibility and toughness.

3. Influence of the Flexibilizer and Co-Toughener

Here, it was examined to what extent the system must have flexibilizer and co-toughener in order to obtain flexible and tear-resistant films. For this purpose, formulations containing no flexibilizer and no co-toughener were produced for comparison, as well as formulations containing no flexibilizer, but containing co-toughener.

Overview of the Flexibility and Toughness Test

| Sample | Flexibilizer/co-toughener | Base epoxy resin | Photo-initiator | Flexibility before ageing | Flexibility 1 h @ 130° C. | Flexibility 14 h @ 130° C. | Toughness before ageing | Toughness 1 h @ 130° C. | Toughness 14 h @ 130° C. |
|---|---|---|---|---|---|---|---|---|---|
| CE5 | — | aE1 | Cyracure 6976 | 3 | 3 | 4 | 3 | 4 | 4 |
| 1 | F2 | aE1 | Cyracure 6976 | 1 | 2 | 2 | 1 | 2-3 | 2-3 |
| CE6 | 2% Fortegra 100 | aE1 | Cyracure 6976 | 2 | 2 | 2-3 | 1 | 2-3 | 3 |
| CE7 | — | aE1 | UV 2257 | 2 | 2-3 | 3 | 2 | 2-3 | 3 |
| 7 | F2 | aE1 | UV 2257 | 1 | 1 | 1 | 1 | 1-2 | 1-2 |
| 3 | F2 2% Fortegra 100 | aE1 | UV 2257 | 1 | 1 | 1 | 1 | 1-2 | 1-2 |

Composition of the Formulations (Values in %)

| Function: | CE5 | 1 | CE6 | CE7 | 7 | 3 |
|---|---|---|---|---|---|---|
| base resin aE1 | 65.3 | 58.8 | 64 | 54.4 | 49 | 48 |
| toughener CS1 | 32.7 | 29.4 | 32 | 32.7 | 29.4 | 28.8 |
| co-toughener | | | 2 | | | 2.0 |
| flexibilizer F2 | | 9.8 | | | 9.8 | 9.60 |
| reactive diluent R3 | | | | 10.9 | 9.8 | 9.60 |
| PI Cyracure UVI 9676 | 2 | 2 | 2 | | | |
| PI UV 2257 | | | | 2 | 2 | 2 |
| Sum: | 100 | 100 | 100 | 100 | 100 | 100 |

The produced films show that, without the use of flexibilizer and co-toughener, the flexibility and toughness decrease. Here, a high flexibility and toughness can be attained under the influence of either flexibilizer or a combination of flexibilizer and co-toughener. The use of photoinitiator UV-2257 again leads to comparatively more flexible films having higher toughness.

What is claimed is:

1. A photocurable epoxy resin composition comprising:
   (a) 30 to 90 wt % of at least one aromatic epoxy resin;
   (b) 2 to 30 wt % of at least one core-shell rubber as toughener;
   (c) 1 to 20 wt % of at least one flexibilizer comprising reactive functional groups selected from epoxy groups, carboxylate groups, amino groups and/or hydroxyl groups;
   (d) 1 to 4 wt % of at least one cationic photoinitiator;
   (e) a co-toughener in an amount of 0.1-10 wt %; and/or
   (f) a reactive diluent in an amount of 0.1-10 wt %; and/or
   (g) an adhesion promoter selected from chelate-modified epoxy resins and epoxy-modified silanes in an amount of 0.1-3 wt %, characterized in that the at least one flexibilizer comprises epoxy groups.

2. The photocurable epoxy resin composition as claimed in claim 1, characterized in that the core-shell rubbers are selected from those that have a core formed of polybutadiene and a shell formed of polybutadiene, polystyrene or a polybutadiene-polystyrene copolymer, wherein the core-shell rubbers are optionally dispersed in a matrix, wherein the matrix is selected from aromatic epoxy resins.

3. The photocurable epoxy resin composition as claimed in claim 1, characterized in that the at least one flexibilizer is a polymer or an oligomer having a glass transition temperature of less than 20° C.

4. The photocurable epoxy resin composition as claimed in claim 1, characterized in that the at least one flexibilizer is selected from the group consisting of polytetramethylene ether glycol, polycaprolactone diol or triol, cardanol glycidyl ethers and dicarboxylic acid bis((3,4-epoxycyclohexyl)methyl) esters.

5. A photocurable epoxy resin composition comprising:
   (a) 30 to 90 wt % of at least one aromatic epoxy resin;
   (b) 2 to 30 wt % of at least one core-shell rubber as toughener;
   (c) 1 to 20 wt % of at least one flexibilizer comprising reactive functional groups selected from epoxy groups, carboxylate groups, amino groups and/or hydroxyl groups;
   (d) 1 to 4 wt % of at least one cationic photoinitiator;
   (e) a co-toughener in an amount of 0.1-10 wt %; and/or
   (f) a reactive diluent in an amount of 0.1-10 wt %; and/or
   (g) an adhesion promoter selected from chelate-modified epoxy resins and epoxy-modified silanes in an amount of 0.1-3 wt %, characterized in that the photoinitiator is selected from sulfonium salts and iodonium salts, wherein the counterion is selected from hexafluoroantimonate, hexafluorophosphate and (tetrakis(pentafluoroaryl)borates.

6. A photocurable epoxy resin composition comprising:
   (a) 30 to 90 wt % of at least one aromatic epoxy resin;
   (b) 2 to 30 wt % of at least one core-shell rubber as toughener;
   (c) 1 to 20 wt % of at least one flexibilizer comprising reactive functional groups selected from epoxy groups, carboxylate groups, amino groups and/or hydroxyl groups;
   (d) 1 to 4 wt % of at least one cationic photoinitiator;
   (e) a co-toughener in an amount of 0.1-10 wt %; and/or
   (f) a reactive diluent in an amount of 0.1-10 wt %; and/or
   (g) an adhesion promoter selected from chelate-modified epoxy resins and epoxy-modified silanes in an amount of 0.1-3 wt %, , characterized in that the reactive diluent is selected from monoglycidyl ethers of aliphatic or aromatic alcohols.

7. The photocurable epoxy resin composition as claimed in claim 1, characterized in that the co-toughener is a polyether polyol.

8. A process for sealing metal-containing electrical lines or contacts for protection against electrochemical corrosion, comprising the steps of:
   (i) applying in the form of a film the photocurable epoxy resin composition as claimed in claim 1 to metal-containing electrical lines or contacts; and
   (ii) curing the film by exposure to light.

9. The photocurable epoxy resin composition as claimed in claim 1, characterized in that the aromatic epoxy resin is selected from bisphenol A diglycidyl ethers and bisphenol F diglycidyl ethers.

10. The photocurable epoxy resin composition as claimed in claim 1, characterized in that the aromatic epoxy resin comprises diglycidyl ethers of bisphenol A, F and/or S, or epoxy novolacs.

11. A photocurable epoxy resin composition comprising:
(a) 30 to 90 wt % of at least one aromatic epoxy resin;
(b) 2 to 30 wt % of at least one core-shell rubber as toughener;
(c) 1 to 20 wt % of at least one flexibilizer comprising reactive functional groups selected from epoxy groups, carboxylate groups, amino groups and/or hydroxyl groups;
(d) 1 to 4 wt % of at least one cationic photoinitiator;
(e) a co-toughener in an amount of 0.1-10 wt %; and/or
(f) a reactive diluent in an amount of 0.1-10 wt %; and/or
(g) an adhesion promoter selected from chelate-modified epoxy resins and epoxy-modified silanes in an amount of 0.1-3 wt %, characterized in that the reactive diluent is selected from monoglycidyl ethers of C12/C14 fatty alcohols and alkyl phenols.

12. A photocurable epoxy resin composition comprising:
(a) 30 to 90 wt % of at least one aromatic epoxy resin;
(b) 2 to 30 wt % of at least one core-shell rubber as toughener;
(c) 1 to 20 wt % of at least one flexibilizer comprising reactive functional groups selected from epoxy groups, carboxylate groups, amino groups and/or hydroxyl groups;
(d) 1 to 4 wt % of at least one cationic photoinitiator;
(e) a co-toughener in an amount of 0.1-10 wt %; and/or
(f) a reactive diluent in an amount of 0.1-10 wt %; and/or
(g) an adhesion promoter selected from chelate-modified epoxy resins and epoxy-modified silanes in an amount of 0.1-3 wt %, characterized in that the reactive diluent is selected from monoglycidyl ethers of para-tert-butyl phenol.

* * * * *